May 8, 1934.  L. E. LA BRIE  1,957,654
WHEEL
Filed Dec. 26, 1925   2 Sheets-Sheet 1
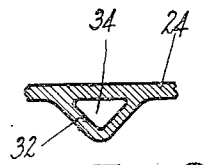
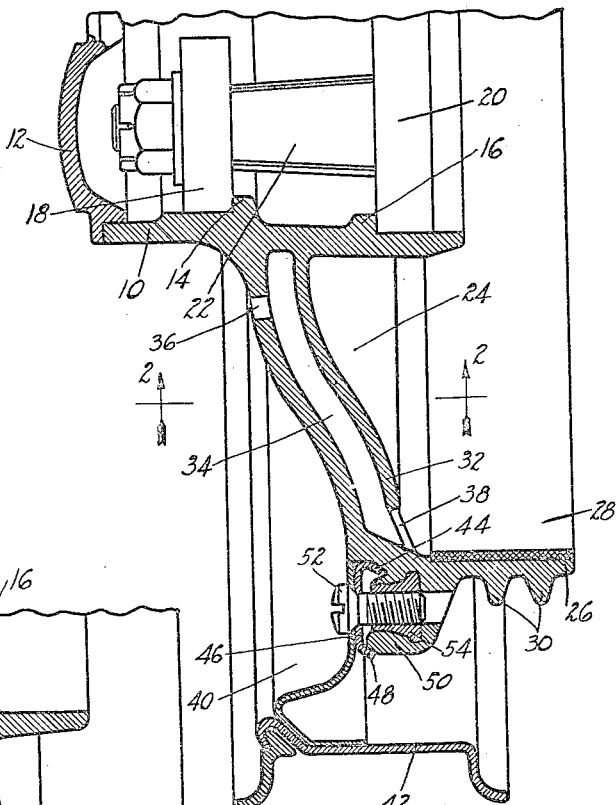
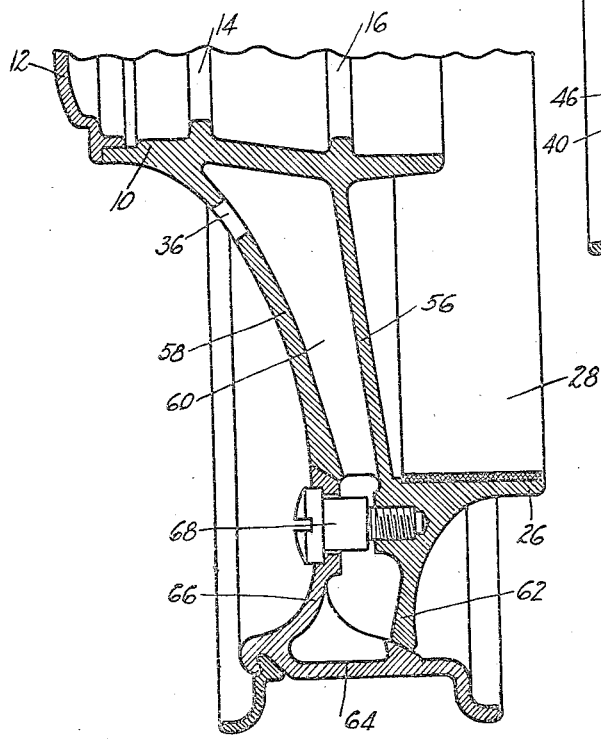
INVENTOR
LUDGER E. LA BRIE
BY
ATTORNEY May 8, 1934. L. E. LA BRIE 1,957,654
WHEEL
Filed Dec. 26, 1925   2 Sheets-Sheet 2
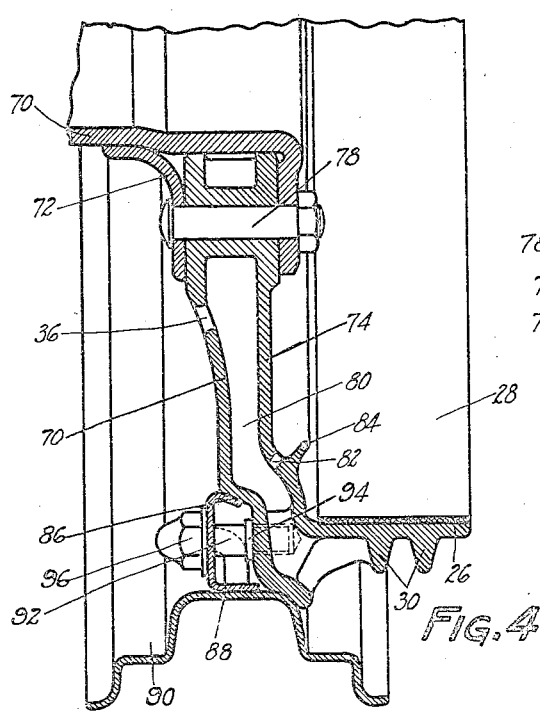
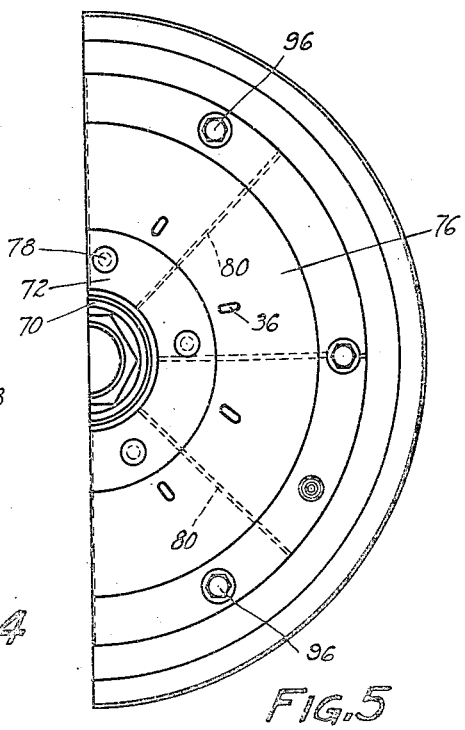
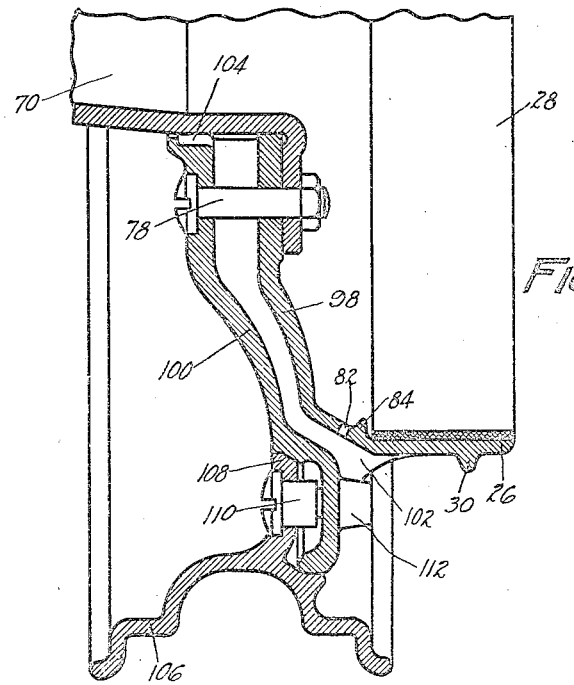
INVENTOR
LUDGER E. LA BRIE
BY
*Jn. W. McConkey*
ATTORNEY Patented May 8, 1934

1,957,654

UNITED STATES PATENT OFFICE 1,957,654

WHEEL

Ludger Elize La Brie, South Bend, Ind., assignor, by mesne assignments, to Bendix Brake Company, Chicago, Ill., a corporation of Illinois Application December 26, 1925, Serial No. 77,870

6 Claims. (Cl. 301—6)

This invention relates to wheels, and is illustrated as embodied in a number of forms of wheels in which the brake drum is utilized as a structural part of the wheel.

One feature of the invention relates to forming the drum, or an equivalent wheel part, with air-circulating means or passages for cooling the brake. In one desirable arrangement, these passages are formed in casting the drum, preferably of an aluminum alloy such as duraluminum. The passages have intake openings at their inner ends, the air being directed, by the centrifugal action of the rotating wheel, in a current directed about the braking flange of the drum.

Another feature of the invention relates to mounting, preferably on the brake drum, a rim and disk part of relatively small diameter such as is used for a balloon tire. In the arrangement at present preferred, the rim and disk part wedges at its inner edge against the drum, and has an outer part wedging against a flange projecting beyond the drum. Various important minor features relate to novel structural details of the rim and disk part, and to an arrangement of fastenings in the radial zone between the two wedging surfaces, and to other novel combinations of parts and desirable particular constructions which will be apparent from the following description of several illustrative embodiments shown in the accompanying drawings, in which:

Fig. 1 is a radial section through one-half of one form of the wheel;

Fig. 2 is a detail section on the line 2—2 of Fig. 1, showing the form of one of the air-circulating passages;

Fig. 3 is a radial section through one-half of a different wheel embodying the invention;

Fig. 4 is a similar radial section through one-half of a third wheel;

Fig. 5 is a side elevation of one-half of the wheel of Fig. 4; and

Fig. 6 is a radial section through one-half of a fourth wheel.

The wheel of Fig. 1 includes a casting of duraluminum or the like, part of which forms a hub 10, which in this instance is threaded or otherwise formed to receive a hub cap 12, and is provided with shoulders 14 and 16 for anti-friction bearings 18 and 20 rotatably mounting the wheel on the spindle 22 of a front wheel knuckle.

Preferably cast integral with hub 10 is a brake drum including a head 24 and a cylindrical braking flange 26, shown as having a high-carbon steel liner 28 and as provided with ribs or heat-radiating external fins 30.

According to an important feature of the invention, the head 24 of the brake drum is formed with hollow ribs 32, which when on the outer face of the wheel are arranged to simulate spokes, and which are arranged on the inside of the drum when it is desired that the outer face of the wheel be smooth. Each rib 32 contains a radial air passage 34, having an intake opening 36 at its inner end, and, in the arrangement of this particular figure, opening at its outer end at 38 into the brake drum just inside flange 26. Air is drawn in at openings 36 and circulated by the centrifugal action of the wheel through openings 38 to cool the brake and the brake drum.

At its outer edge, the drum is rabetted in casting, to form a shoulder for the inner edge of an outer annular pressed-steel disk 40 carrying a rim 42. This shoulder merges into an annular wedge surface engaged by a wedge flange 44 at the inner edge of a stamping or ring 46 welded or otherwise secured to the back of disk 40. Ring 44 also has a wedge flange 48 at its outer edge, which engages a conical or wedge surface on the outer edge of a flange 50 projecting beyond drum flange 26, as a continuation of the head 24. Ring 46 is unsupported between the two flanges 44 and 48, and consequently is tensioned by screws or other fastenings 52 threaded into hardened bushings 54 cast into enlargements of flange 50.

The wheel of Fig. 3 differs from that described above, in that the head of the drum is cast with inner and outer walls 56 and 58, connected at intervals by webs or partitions 60, thus defining passages into which the air enters by openings 36. In this case the air currents circulate over the outside of the braking flange 26, between radially-extending spokes, or spaced flanges 62 projecting beyond the drum.

In Fig. 3, the outer rim and disk part 64 is a one-piece duraluminum casting, having a wedge surface directly engaging wedge surfaces on the outer edges of spokes 62, and another inner wedge surface on the inner edge of an inwardly-extending flange 66 engaging a cooperating wedge surface or shoulder on the outer edge of wall 58 of the head of the brake drum. Screws or other fastenings 68 passing through flange 66 are threaded into enlarged bosses at the bases of spokes 62.

In Figs. 4 and 5, there is a separate hub 70, with a clamping part 72 cooperating to embrace the inner end of the double walls 74 and 76 forming the head of the brake drum, the parts being fastened together by bolts 78. Walls 74 and 76 are connected at intervals by webs or partitions 80, defining sector-shaped air passages having near their inner ends the intake openings 36.

In this arrangement, inner wall 74 is continued as the braking flange 26, there being outlet openings 82 inside the drum if desired. I prefer to provide adjacent openings 82 a flange 84 for catching oil dripping from the end of hub 70, and directing it into the air passages so that it cannot reach the brake linings.

In any case, however, the outer part of wall 76 is first offset to form a conical or wedge-shaped surface engaged by a flange 86 at the inner edge of an annular channel stamping 88 welded or otherwise secured to a drop-center rim 90, wall 76 then being flared inwardly to direct the air over the braking flange 26 and to form a wedge surface directly engaged by the angle of rim 90. Fastenings 92 passing through stamping 88 are threaded into hardened bushings 94 cast or fastened into enlarged bosses formed in webs 80. As illustrated, these fastenings are studs, on which are threaded cap nuts 96.

In Fig. 6, the inner and outer walls 98 and 100 of the head of the drum are connected as before by webs or partitions 102, but the intake openings are in the form of notches 104 in the inner edges of wall 100. With this wheel, I prefer to use a cast duraluminum rim 106, formed with a drop center, and having a shoulder seated on the outer edge of wall 100. The rim 106 has an inwardly-extending flange or disk part 108 wedged against a conical shoulder formed in wall 100, by means of fastenings 110 threaded into enlarged bosses 112 formed in webs 102. While in Fig. 4 there are thimbles connecting walls 74 and 76 for bolts 78, in Fig. 6 these thimbles are dispensed with.

While a number of illustrative embodiments of the invention have been described in detail, it is not my intention to limit its scope to those particular embodiments, or otherwise than by the terms of the appended claims.

I claim:

1. A brake drum having a cylindrical braking flange and provided with radial air passages having intake openings near the drum axis and having outlets adjacent said flange and arranged to direct air currents about said flange.

2. A one-piece cast hub and brake drum formed integrally with radially-extending air passages having intake openings near the hub axis and having outlets directing the air currents about the outer part of the drum.

3. A cast brake drum having a cylindrical braking flange and formed integrally with radially-extending air passages having intake openings near the drum axis and having outlets directing the air currents against said flange.

4. A brake drum having a cylindrical outer braking flange and hollow spoke-simulating ribs on its head, each rib containing an air passage having an intake opening at its inner end and an outlet at its outer end directing a current of air against said flange.

5. A brake drum having a braking surface and a rim part, and centrifugal air-circulating means comprising a plurality of spaced radial ribs connecting and supporting said drum and rim part in spaced relation for circulating air between the braking surface of said drum and its rim part.

6. A brake drum having a cylindrical outer braking flange and hollow spoke-simulating ribs on its head, each rib containing an air passage having an intake opening at its inner end and an outlet at its outer end adjacent said flange.

LUDGER ELIZE LA BRIE.